United States Patent

Feiken

[11] Patent Number: 6,070,795
[45] Date of Patent: Jun. 6, 2000

[54] METHOD OF MAKING RECOVERABLE SMART CARD TRANSACTIONS, A METHOD OF RECOVERING SUCH A TRANSACTION, AS WELL AS A SMART CARD ALLOWING RECOVERABLE TRANSACTIONS

[75] Inventor: Albertus Feiken, Amstelveen, Netherlands

[73] Assignee: Koninklijke KPN N.V., Groningen, Netherlands

[21] Appl. No.: 08/935,914

[22] Filed: Sep. 23, 1997

[30] Foreign Application Priority Data

Sep. 24, 1996 [EP] European Pat. Off. ............ 96202661

[51] Int. Cl.⁷ ........................................... G06K 5/00
[52] U.S. Cl. ..................... 235/380; 235/375; 235/384; 235/383; 235/492; 902/1; 902/13; 902/21; 902/22
[58] Field of Search .................... 235/492, 380, 235/379, 382, 375, 384, 383; 902/1, 13, 21, 22, 26

[56] References Cited

U.S. PATENT DOCUMENTS 5,565,857  10/1996  Lee ..................................... 340/825.34
5,742,756   4/1998  Dillaway et al. ....................... 395/186
5,848,400  12/1998  Chang ...................................... 705/35

FOREIGN PATENT DOCUMENTS

| 0 570 924 | 11/1993 | European Pat. Off. . |
| 0 637 004 | 2/1995 | European Pat. Off. . |
| 0 686 947 | 12/1995 | European Pat. Off. . |
| 2 667 192 | 3/1992 | France . |
| 2 689 662 | 10/1993 | France . |
| 35 16 358 | 11/1986 | Germany . |
| 44 39 266 | 4/1996 | Germany . |
| WO 94/24673 | 10/1994 | WIPO . |

*Primary Examiner*—Thien M. Le
*Assistant Examiner*—Daniel S Felten
*Attorney, Agent, or Firm*—Oblon, Spivak, McClelland, Maier & Neustadt, P.C.

[57] ABSTRACT

A method of recovering and thus possibly completing interrupted smart card transactions includes providing a smart card that stores a first and a second pointer, the second pointer being used to indicate an update of the first pointer. In the case of an interruption of a smart card transaction, these pointers are be used to indicate whether a change of a card balance has taken place by the equality of the values of these pointers.

7 Claims, 4 Drawing Sheets

METHOD OF MAKING RECOVERABLE SMART CARD TRANSACTIONS, A METHOD OF RECOVERING SUCH A TRANSACTION, AS WELL AS A SMART CARD ALLOWING RECOVERABLE TRANSACTIONS

Method of making recoverable smart card transactions, a method of recovering such a transaction, as well as a smart card allowing recoverable transactions.

BACKGROUND OF THE INVENTION

The present invention relates to a method of recovering transactions made with smart cards. More in particular, the present invention relates to a method of completing interrupted smart card payments and revaluations. The present invention further relates to a smart card allowing interrupted transactions to be completed.

In existing smart card transactions, such as payments, an exchange of data takes place between a terminal (such as an electronic cash register equipped with a smart card reader) and a smart card (also called IC card). It can happen that an interruption of the payment takes place before this exchange of data is completed. Such an interruption may e.g. be caused by a power failure, or by a premature withdrawal of the card from the card reader. The result of such an interruption may cause a loss of data, which in turn may cause a loss of money.

European Patent Application EP 0 637 004, which is herewith incorporated by reference in this text, discloses a method of exchanging data between a smart card and a terminal. In this Prior Art method, it is ensured that the (security module of the) terminal is not credited before the smart card is debited. However, if the communication between the card and the terminal is interrupted after the card is debited but before the terminal is credited, it remains uncertain whether the debiting of the card has actually taken place.

The Prior Art does therefore not provide a method of making payments in which interrupted payments can be continued.

SUMMARY OF THE INVENTION

It is an object of the invention to overcome the above-mentioned and other disadvantages of the prior art and to provide a method which allows the recovery and completion of interrupted payments. It is another object of the present invention to provide a method which allows to determine whether a change of a card balance has taken place. It is a further object of the present invention to provide a smart card allowing the recovery of interrupted payments.

Accordingly, the present invention provides a method of changing a balance in a memory of a smart card in response to a command from a terminal, the method comprising the steps of:

retrieving an old balance from a memory location indicated by the value of a first pointer, adding an offset to the value of a second pointer, said value initially being equal to the value of the first pointer, storing a new balance in the memory location indicated by the sum of the value of the first pointer and the offset, and adding the offset to the value of the first pointer.

Using this method, the equality of the first and second pointer permits to conclude that the new balance has been stored in the memory. In the case of an interrupted transaction, a proper continuation of the procedure can thus be effected.

It will be understood that the initial equality of the first and second pointers is chosen for convenience only and that any (second) offset between the pointers may in practice exist.

By using a second pointer, it can thus effectively be checked whether the first pointer has been updated.

Advantageously, the method of the invention further comprises the step of storing in the smart card a random number received from the terminal. This allows to determine with virtual certainty that the interrupted transaction, rather than another transaction, is being completed.

Preferably, the method of the invention further comprises the step of invalidating the random number stored in the smart card if the card receives a new random number not equal to the stored random number. A new random number indicates either a new transaction or replay (by an unauthorized party) of the interrupted transaction. The invalidation of the stored random number is thus appropriate.

By storing a random number identifying the transaction, it is thus possible to complete that transaction at a later stage.

The present invention further provides a method of completing the changing of a balance in a memory of a smart card, the changing being effected by a method of any of the preceding claims, the completing comprising the steps of:

sending a restore command from the terminal to the card, comparing, in the card, the values of the first pointer and the second pointer, sending, in the case of equality of the values, an acknowledgement from the card to the terminal.

In this way the two pointers can advantageously be used to determine whether the balance change had actually taken place before the interruption occurred. As a result, a change of a balance kept in the security module of the terminal may be made. Preferably, in case the terminal stores a random number previously sent to the card to identify the transaction, the above method further comprises the step of:

retrieving, upon receipt of the restore command, the random number stored in the card, generating, in the card, a message authentication code using the retrieved random number, and adding said code to the acknowledgement, checking, in the terminal, the authentication code, and discarding the acknowledgement if the authentication code is not correct.

It is possible to include in the restore command a random number identifying the interrupted transaction, and to compare, in the card, the retrieved and received random numbers so as to verify the identity of the transaction. However, the re-transmission of the random number may be omitted if the message authentication code is checked in the terminal, e.g. by re-generating the code using the stored random number.

The message authentication code, based on the random number identifying the transaction, is thus effectively used to determine whether an actual completion of the interrupted transaction is attempted or a new transaction is started. In the latter case, the pointers may be influenced by the new transaction, invalidating the result of a completion and thus necessitating the invalidation of the identifying random numbers and/or pointers.

BRIEF DESCRIPTION OF THE DRAWINGS

The invention will further be explained with reference to the accompanying drawings, in which.

EXEMPLARY EMBODIMENTS

Figure 1:
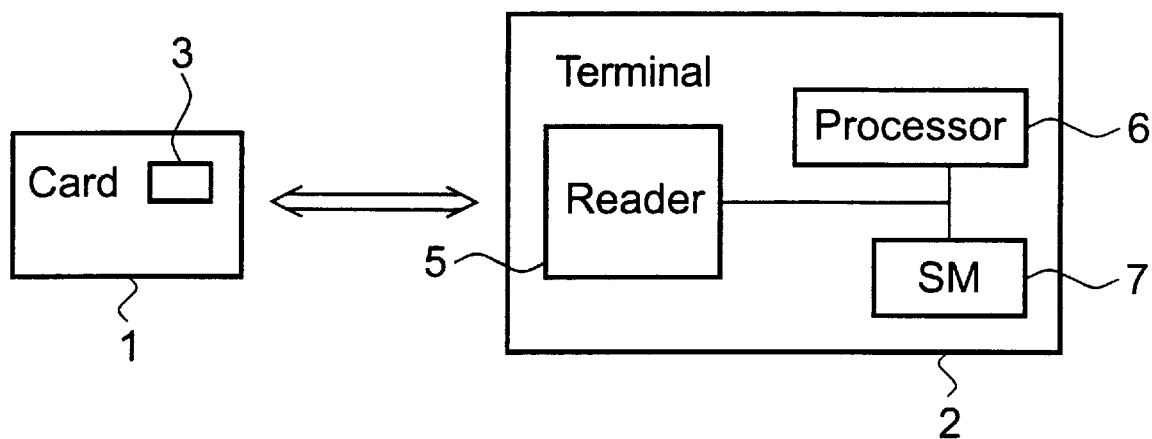
FIG. 1 schematically shows a smart card as well as a terminal equipped for smart card transactions, FIG. 2 schematically shows the exchange of data between a smart card and a terminal during a payment transaction, FIG. 3 schematically shows in greater detail part of the process shown in FIG. 2, FIG. 4 schematically shows a memory section comprising records indicated by pointers, FIG. 5 schematically shows an alternative embodiment of a memory section comprising records indicated by pointers, and FIG. 6 schematically shows a data format of data allowing the completion of an interrupted transaction.

The payment system shown schematically and by way of example in FIG. 1 comprises a smart card 1 and a terminal 2. The smart card 1 comprises an integrated circuit 3 embedded in a substrate. The integrated circuit 3 may e.g. comprise a processor, one or more memory circuits (e.g. RAM and/or EEPROM) and an I/O (input/output) circuit linked by a data bus. The terminal 2, which may be a suitable cash register, comprises e.g. a card reader/writer (denoted as "Reader") 5, processing means 6 (denoted as "Processor" and comprising e.g. a microprocessor and a memory) and at least one security module (denoted as "SM") 7. The card 1 may exchange data with the terminal 2 when inserted in the reader 5. In the case of contactless cards, the reader 5 may be equipped with suitable electromagnetic or infrared means for contactless data exchange. The security module 7 is a unit in which certain transaction data are security stored. Preferably, a security module is a removable, fraud-proof unit. However, the term security module as used in this text may also refer to a memory location or register for the storage of transaction data.

Figure 2:
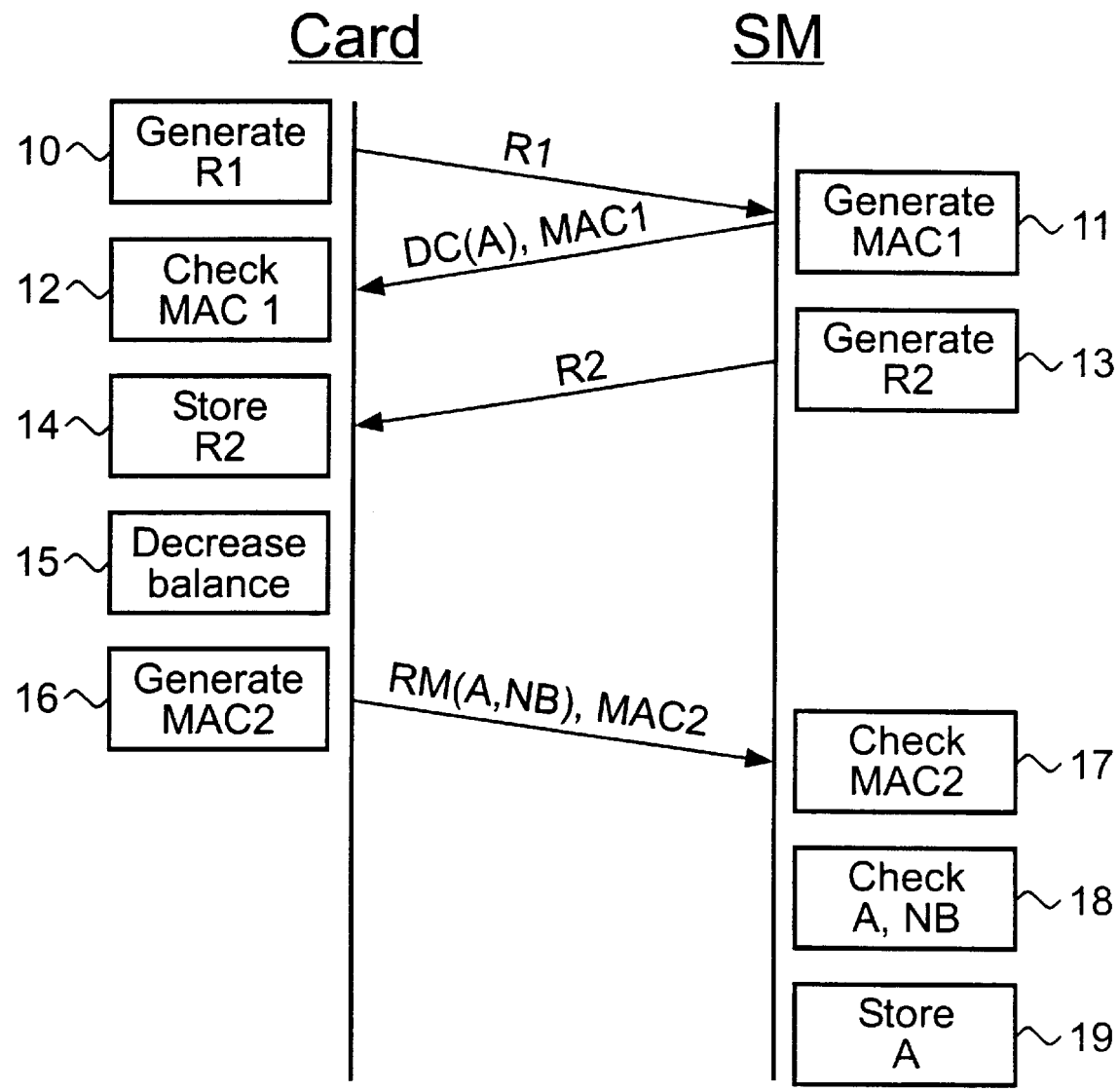

In FIG. 2, an exchange of data between (the integrated circuit of) a smart card ("Card") and the security module ("SM") of a terminal is shown. In the example of FIG. 2, a decrease transaction (decrease of the balance of the card by way of payment) is shown. It will be understood that the invention is equally well applicable to increase transactions, also called revalue transactions, in which the card alance is increased.

The process shown by way of example in FIG. 2 begins with the card generating a random number R1 in step 10. It will be understood that other steps, which (like steps 10–12) are not essential to the present invention, may precede step 10. The random number R1, which serves to authenticate the security module and to prevent replay of the transaction, is sent to the security module (SM) of the terminal. In response, the security module generates in step 11 a first message authentication code MAC1 on the basis of a decrease command DC and the random number R1. This code may be generated using a suitable cryptographic function, such as a so-called hash function. The decrease command DC comprises the amount A the card balance is to be decreased with. The command DC and the appended code MAC1 are sent to the card.

As stated before, instead of a decrease command, another command can be sent to the card. Such a change balance command may be an increase balance command, or a set balance command in which a new balance is written independent of the existing one. It will be understood that a particular smart card may store more than one balance, e.g. different balances for several different currencies and/or for units corresponding with different institutions (banks, airlines, etc.).

In step 12, the card checks the received message authentication code MAC1, e.g. by regenerating the code on the basis of the received decrease command DC and the random number R1 temporarily stored in the card. If the message authentication code is found to be correct, the card may optionally issue an Authentication Valid Message (not shown in FIG. 2) and the procedure continues with step 13. If the code is found to be incorrect, the procedure may be terminated or a request for repeated transmission of the decrease command may be issued.

In the mean time, the security module generates a second random number R2 in step 13 and sends this random number R2 to the card. The card stores the second random number R2 in step 14.

In step 15, the card balance is decreased (in general: changed) by storing the new balance, i.e. the old balance minus the amount A, in a suitable memory location: NB← (OB-A). This will further be explained below with reference to FIGS. 3, 4 and 5.

In step 16, the card generates a second message authentication code MAC2 on the basis of a response message R1 and the stored second random number R2. The response message RM constitutes an acknowledgement of the successful execution of the decrease command DC and comprises e.g. the new balance and/or the amount A. The message RM and the appended code MAC2 are sent to the security module.

It should be noted that the message authentication code MAC2 could be stored for recovery purposes, rather than the random number R2. Storing the number R2, as done in step 14, has the advantage of being earlier in time, i.e. before the actual change of the balance in step 15.

The security module checks the received code MAC2 in step 17, using the second random number R2 stored in the security module. In step 18, the data contained in the response message RM may be checked. In step 19, the amount A may be added to a terminal balance.

Figure 3:
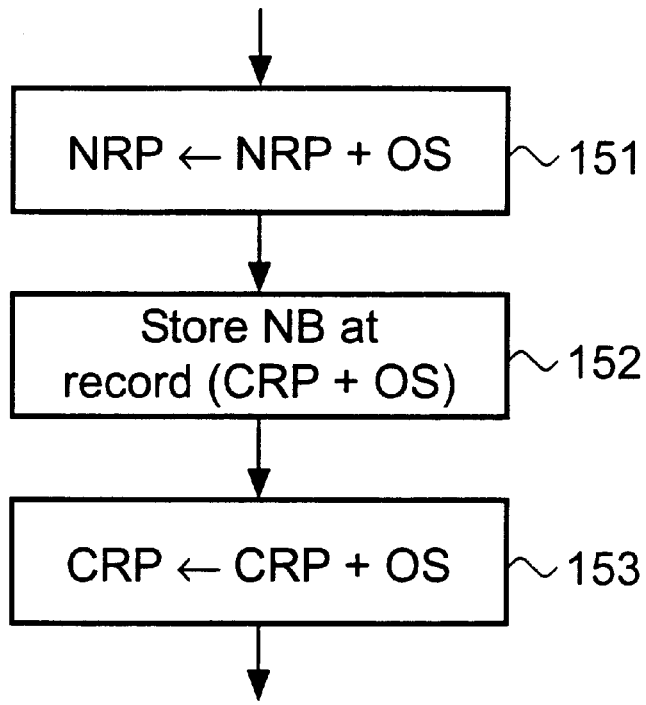

In FIG. 3 step 15 of FIG. 2 is schematically shown in more detail. Step 15 consists of a number of substeps, of which the substeps 151–153 are shown. In accordance with the present invention, two pointers will be used to indicate memory locations (in general: records) where balances are stored. It will be assumed that the old and the new balance will be stored in different memory locations. A first pointer, the Current Record Pointer CRP, points at the record (memory location or set of memory locations) where the last balance (i.e. the "old" balance) was stored. A second pointer, the Next Record Pointer NRP, points at the memory location where the new balance is to be stored.

Figure 4:
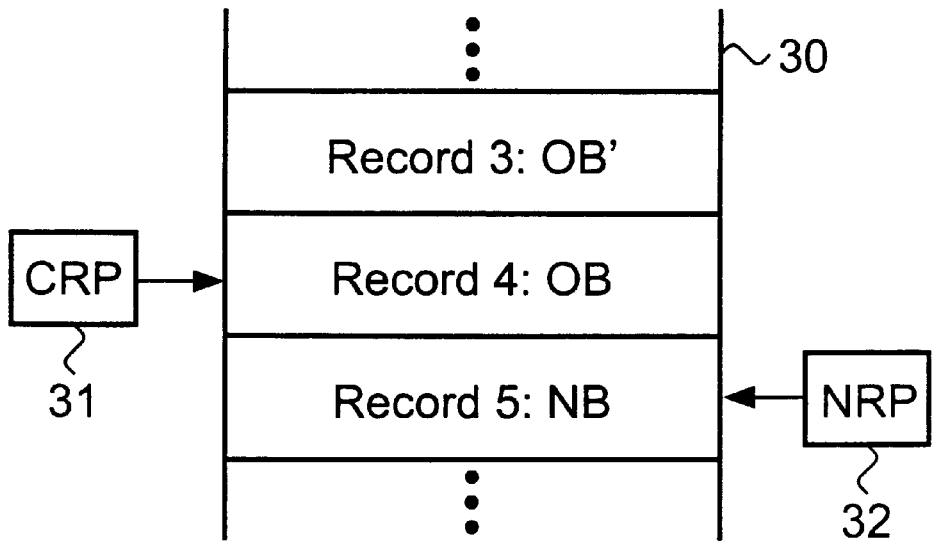

It will be understood that the pointers NRP and CRP are stored in suitable memory means, such as counters 31 and 32 shown in FIG. 4. Advantageously, EEPROM type memory means are used to stored these pointers to prevent the loss of these pointers in the case of a power loss.

Substep 151 involves, in accordance with the present invention, the increment of a Next Record Pointer NRP, rendered as NRP ← NRP+OS, the sign "←" meaning "taking on the value of". This pointer, the use of which will further be explained with reference to FIG. 4, points after the execution of step 151 at the memory location where the new balance, i.c. the old balance minus the decrease amount A, will be stored. In step 152, the actual decrease of the card balance takes place by reading the old balance OB from the memory location indicated by the Current Record Pointer CRP, substracting (in the case of a decrease of the card balance) the amount A from the old balance OB and storing the new balance NB in the memory location indicated by the sum of the Current Record Pointer CRP and an offset OS, the offset OS preferably being equal to one. That is, the memory location in which the new balance is stored depends on the Current Record Pointer CRP and is preferably the "next" memory location, i.e. the memory location having an address CRP+1. Alternatively, another offset OS could be used, such as 2, 4 or −1. It will be understood that the result of the adding operation CRP+OS will yield a result modulo N, N being the number of records available.

After storing the new balance, the Current Record Pointer CRP is incremented by the offset OS (i.e. preferably +1) in step 153, after which the Current Record Pointer points at the new balance NB.

The use of the Next Record Pointer NRP of the present invention will now be explained with reference to FIG. 4. As stated before, the Next Record Pointer NRP points at the location where the new balance is to be stored, i.e. at a location having the address CRP+OS. After the successful completion of a decrease action, the Next Record Pointer NRP and the Current Record Pointer CRP should point to the same memory location and thus have identical values. However, after an unsuccessful action, the pointers will not have identical values. Assume, referring to FIG. 4, that record 4 of a cyclical memory 30 contains the current or last stored balance, i.e. the "old" balance OB (the preceding record 3 may store a previous balance OB'). Both CRP and NRP have the value four. In step 151 (as shown in FIG. 3) the Next Record Pointer NRP is incremented. If the offset OS equals one, the new value of NRP is five and NRP points at record 5. In step 152 of FIG. 3, the old balance OB is read from record 4 and the new balance NB is stored in record 5, as a new balance is stored in record (CRP+1). At that stage of the procedure, the situation as depicted in FIG. 4 results. If the action is successful, the Current Record Pointer CRP is incremented in step 153, resulting in the equality of the Current Record Pointer CRP and the Next Record Pointer NRP. However, is the procedure was broken off in step 152, Current Record Pointer CRP will not have been incremented and there will be no equality of CRP and NRP. This result can advantageously be used to detect whether the storing of a new balance has been completed.

That is, if the procedure is interrupted, e.g because the card was prematurely removed from the reader, it is possible to detect whether the change of the card balance has taken place by comparing the values of NRP and CRP. Referring again to FIG. 2, if the procedure is interrupted, e.g. by a power failure in the terminal before the security module has completed the procedure or by a premature removal of the card before step 16 has been completed, it is now possible to repeat part of the procedure, e.g. by sending a restore command (RC) to the card. When the card receives a restore command, it checks whether the pointers NRP and CRP are equal. If NRP equals CRP, a decrease of the card balance has taken place and the response message RM may be sent again by way of acknowledgement. If NRP does not equal CRP, the decrease has not taken place and the entire payment (decrease) transaction may be either repeated or cancelled.

It should be noted that in principle step 151 of FIG. 3 could be carried out after step 153. However, by keeping the number of (sub)steps after the updating of the balance to a minimum, the chance of the transaction being interrupted is diminished.

It should further be noted that if a new balance influencing command (such as a decrease or increase command) is received, the random number R2 is preferably invalidated in order to prevent replay. Alternatively or additionally, the Next Record Pointer NRP is invalidated. It should be noted that a restore command is not normally considered to constitute a balance influencing command.

Figure 5:
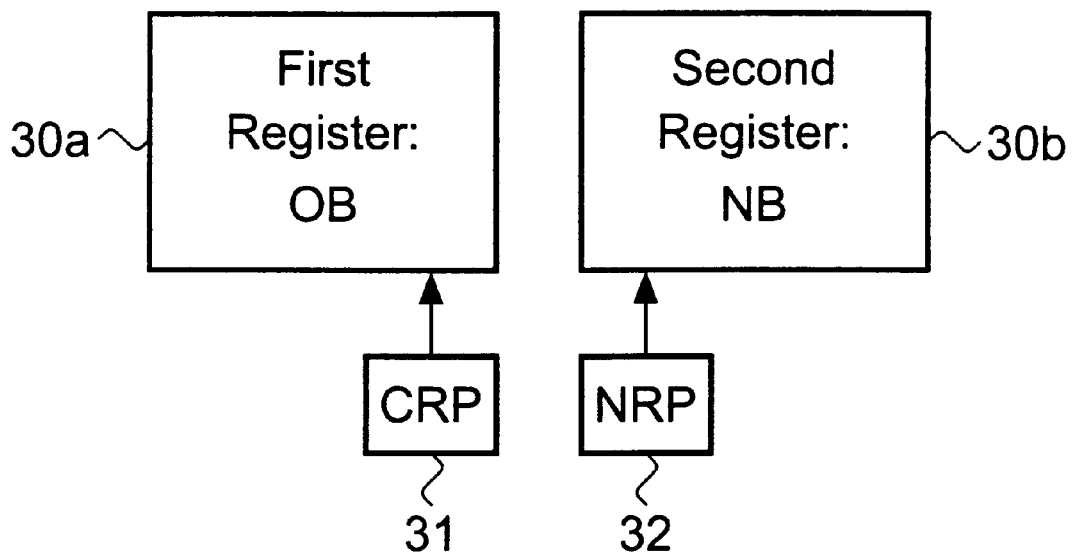

FIG. 5 shows an embodiment of memory means in which the old and new balance are alternatingly written in a first register 30*a* and a second register 30*b*. That is, if the old balance OB is stored in the first register 30*a* then the new balance NB will be stored in the second register 30*b* and vice versa. It will be understood that this embodiment is equivalent to the embodiment of FIG. 4.

Figure 6:
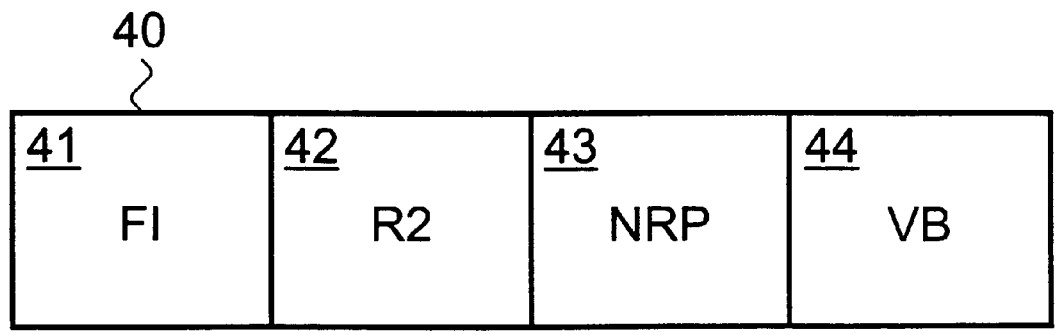

FIG. 6 shows an example of the format of a data field stored in the card which enables the completion of an interrupted transaction. The data field 40 comprises subfields 41–44 containing a File Identifyer FI, the abovementioned second random number R2, the Next Record Pointer NRP and a Validity Bit VB respectively. The Validity Bit VB indicates whether the random number R2 may be used to complete transaction, i.e. to execute step 16 of FIG. 2 again.

It will be understood by those skilled in the art that the embodiments described above are given by way of example only and that many modifications and additions are possible without departing from the scope of the present invention.

I claim:

1. A method of recovering and completing an interrupted smart card transaction including an exchange of data between a terminal and a smart card, wherein said interrupted smart card transaction takes place before said exchange of data is completed, said method comprising the steps of:

retrieving an old balance from a memory location of the smart card, said memory location being indicated by a value of a first pointer;

adding an offset value to a value of a second pointer that is initially equal to the value of the first pointer to form a value indicating a memory location of the smart card for storing a new balance;

storing the card balance in the location of said memory indicated by the sum of the value of the first pointer and the offset;

adding the offset to the value of the first pointer; be found;

comparing, in the smart card, the values of the first and second pointers and concluding from an equality of the values of the first and second pointers that the new balance has been stored in the memory of the smart card and concluding from an inequality of the values of the first and second pointers that the new balance has not been stored in the memory of the smart card; and wherein said completing an interrupted smart card transaction occurs after an interruption of an exchange of data between a terminal and a smart card and comprises the additional steps of, sending a restore command from said terminal to said smart card, checking whether the value of the first pointer and the value of the second pointer are equal, and when the checking step determines that the value of the first pointer and the value of the second pointer are equal, sending an acknowledgement from the smart card to the terminal.

2. The method as claimed in claim 1, wherein the transaction is a decrease transaction in which the balance of the smart card is decreased.

3. The method as claimed in claim 1, further comprising selecting the offset to have value of one.

4. The method as claimed in claim 1, further comprising the step of storing in the smart card a random number received from the terminal.

5. The method as claimed in claim 4, further comprising the step of invalidating the random number stored in the smart card when the smart card receives a new balance influencing command.

6. The method as claimed in claim 1, further comprising the step of producing in the smart card a response message after the step of adding the offset to the value of the first pointer and adding a message authentication code to the response message.

7. The method as claimed in claim 6, further comprising,
storing in the smart card a random number received from the terminal,
receiving a restore command,
responding to the received restore command to retrieve the random number,
generating a message authentication code in the smart card using the retrieved random number,
adding said authentication code to the acknowledgment,
checking, in the terminal, the authentication code, and
discarding the acknowledgment if the authentication code is not correct.

* * * * *